United States Patent [19]

Zoch

[11] Patent Number: 4,608,160
[45] Date of Patent: Aug. 26, 1986

[54] SYSTEM FOR SEPARATING LIQUIDS
[75] Inventor: Roger L. Zoch, McFarland, Wis.
[73] Assignee: Nelson Industries, Inc., Stoughton, Wis.
[21] Appl. No.: 668,630
[22] Filed: Nov. 5, 1984
[51] Int. Cl.[4] .............................................. C02F 1/40
[52] U.S. Cl. .................................. 210/114; 210/115; 210/519; 210/540
[58] Field of Search ............... 210/114, 115, 519, 540, 210/123, 521, 456

[56] References Cited

U.S. PATENT DOCUMENTS

| | | | |
|---|---|---|---|
| 1,237,069 | 8/1917 | Loeb | 210/540 X |
| 1,639,373 | 8/1927 | Glover | 210/519 |
| 2,285,893 | 6/1942 | Boosey | 210/519 |
| 3,565,252 | 2/1971 | Sheehy et al. | 210/115 X |
| 3,794,171 | 2/1974 | Kimura et al. | 210/519 X |
| 3,965,013 | 6/1976 | Jackson | 210/519 |
| 4,014,791 | 3/1977 | Tuttle | 210/114 |
| 4,111,805 | 9/1978 | Van Pool et al. | 210/540 X |
| 4,111,806 | 9/1978 | Wright et al. | 210/540 X |
| 4,315,822 | 2/1982 | Jaisinghani | 210/115 X |
| 4,385,986 | 5/1983 | Jaisinghani et al. | 210/123 |
| 4,406,789 | 9/1983 | Brignon | 210/519 |
| 4,426,293 | 1/1984 | Mason et al. | 210/115 X |

OTHER PUBLICATIONS

"General Systems Description-The Sarex 25 or 50 Oil-Water Separators" (Apr. 20, 1981).
Liquid/Liquid Separators, Universal Silencer, Product Catalog No. 441 (1981).
Nelson Filtration Products-Oil/Water Separator.
"Separating Oil and Water Doesn't Have to Separate Your Profits," Universal (1982).
"A Study of Oil/Water Separation in Corrugated Plate Separators" Jaisinghani et al, Journal of Engineering for Industry, Nov. 1979, Col. 101.

Primary Examiner—Richard L. Chiesa
Attorney, Agent, or Firm—Andrus, Sceales, Starke & Sawall

[57] ABSTRACT

A system for separating two immiscible liquids of different specific gravities, such as oil and water. The system includes a gravity separator and oil-contaminated water is continually pumped into the separator tank by a main pump and is impinged against an inclined baffle which directs the water upwardly toward the top of the tank. Larger droplets of oil are collected as a layer in the upper end of the tank, while the effluent is discharged from the lower end of the tank to a coalescer unit, where residual oil is removed from the water. A liquid level sensor is located in the upper end of the separator tank and when the collected layer of oil reaches the level of the sensor, the sensor discontinues operation of the main pump and operates an oil pump to discharge the collected layer of oil from the separator tank to an oil recovery location. The oil collected in the coalescer unit is recirculated and mixed with the oil-contaminated water being introduced into the separator tank.

5 Claims, 3 Drawing Figures

4,608,160

SYSTEM FOR SEPARATING LIQUIDS

BACKGROUND OF THE INVENTION

Separator systems have been used in the past with sea-going vessels to separate oil from bilge water before the bilge water is discharged overboard.

U.S. Pat. No. 4,385,986 discloses a separation system in which the contaminated water from the bilge is pumped to a gravity separator containing a bundle of parallel inclined separator plates. Larger oil droplets will rise along the plates to the top of the separator tank, while solid particles flow to the bottom of the tank for collection in a sump. In accordance with the system of the aforementioned patent, the collected layer of oil in the separator tank is discharged to an oil recovery location, while the effluent containing a minor amount of residual oil is conducted to a regenerative filter where the residual oil is removed from the water, so that the water can be safely discharged overboard.

The separating system as disclosed in U.S. Pat. No. 4,385,986 is utilized with relatively high flow rates in the neighborhood of 10 gallons per minute. However, there has been a need for a smaller, less expensive separating system that requires less floor space and can be used with smaller flow rates.

SUMMARY OF THE INVENTION

The invention is directed to a system for separating two immiscible liquids of different specific gravities, such as oil and water. In accordance with the invention, the oil contaminated water is continually pumped into a separator tank and directed against an inclined baffle plate which extends upwardly away from the inlet. The sides of the baffle are in contiguous relation with the inner surface of the tank, so that the water is directed upwardly across the baffle and the larger oil droplets will separate from the water and collect as a layer in the upper end of the separator tank, while the water effluent will be discharged from the bottom of the tank.

A liquid sensor, which can take the form of a capacitance probe, is positioned in the upper end of the tank and when the layer of collected oil reaches the level of the sensor, the sensor will discontinue operation of the main pump and actuate a second pump to withdraw the collected layer of oil from the upper end of the separator tank. After a predetermined quantity of the oil has been removed from the tank, operation of the oil pump is terminated and operation of the main pump is resumed.

The water or effluent discharged from the separator tank is pumped to a coalescer unit which contains a replaceable coalscer element. The water is introduced into the interior of the element and flows outwardly, with residual oil droplets collecting on the outer surface of the element and coalescing to form larger droplets which will release from the element and be collected in the upper end of the coalescer tank.

The treated water, containing less than 15 ppm of oil, is then discharged from the coalescer tank, while the collected layer of oil in the upper end of the coalescer tank is continually recirculated and mixed with the oil-contaminated water being fed to the gravity separator.

The separating system of the invention is compact in size and inexpensive and will effectively separate oil from contaminated water, regardless of the oil content in the contaminated water, to a value less than 15 ppm.

The unique baffle arrangement in the separator tank provides increased residence time for the water flowing through the tank, thereby providing a more effective separation of the oil from the water. The inclined attitude of the baffle produces a gradual reduction of velocity for the incoming water with the result that there is minimal turbulence in the region of the sensor and at the oil-water interface.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
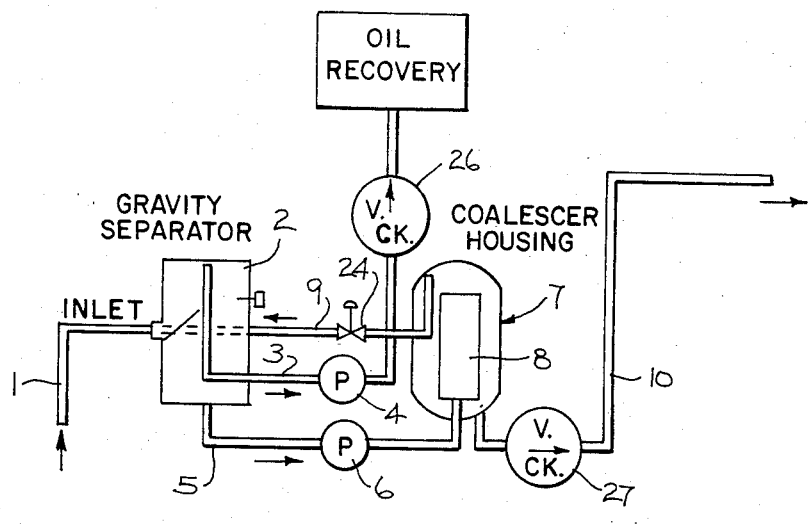
FIG. 1 is a schematic representation of the separating system of the invention.

FIG. 1 is a schematic representation of a system for separating two immiscible liquids of different specific gravities, such as separating oil from water. The oil contaminated water is continuously pumped through line 1 from a bilge or other tank to a gravity separator 2 where larger drops of oil will be separated from the water and will be collected as a layer in the upper end of the separator tank. The collected oil is periodically removed from the gravity separator 2 through a line 3 by operation of pump 4.

The water effluent is discharged from the lower end of separator 2 through line 5 by main pump 6 and is delivered to a coalescer unit 7 containing a coalescer element 8. Residual oil is collected as a layer in the upper end of the coalescer unit 7 and is continually recirculated to the separator 2 through line 9, while the effluent containing less than 15 ppm of oil is discharged through line 10 overboard or to a water collection site.

Figure 2:
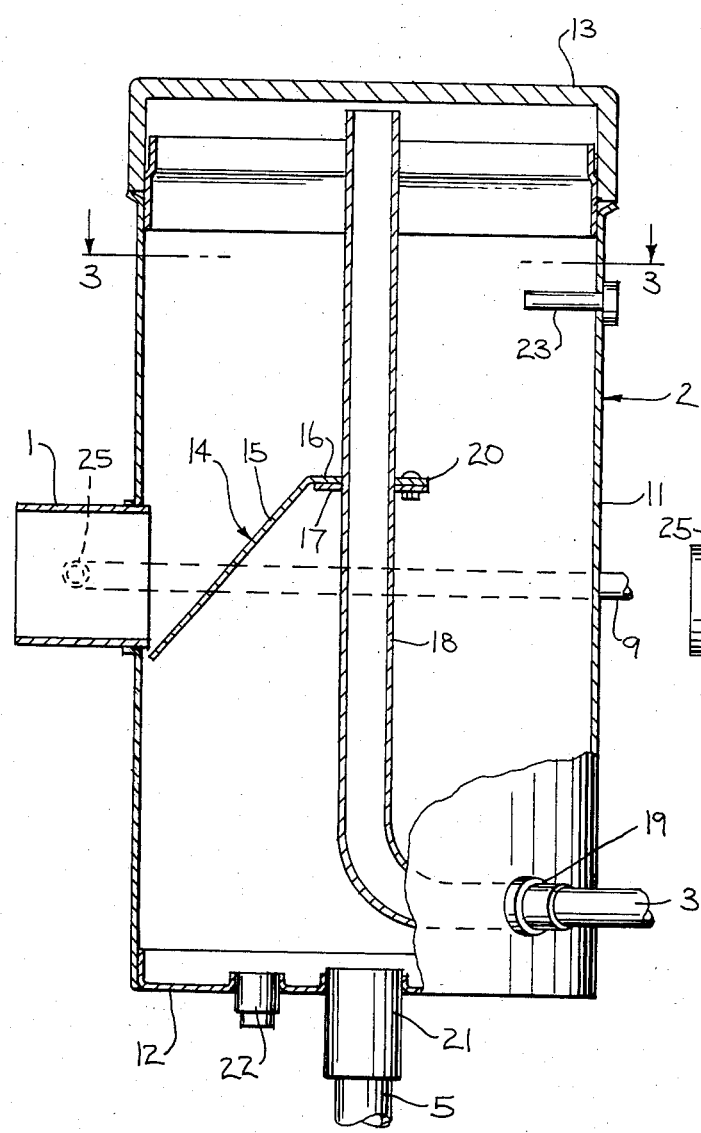
FIG. 2 is a vertical section of the gravity separator.
Figure 3:
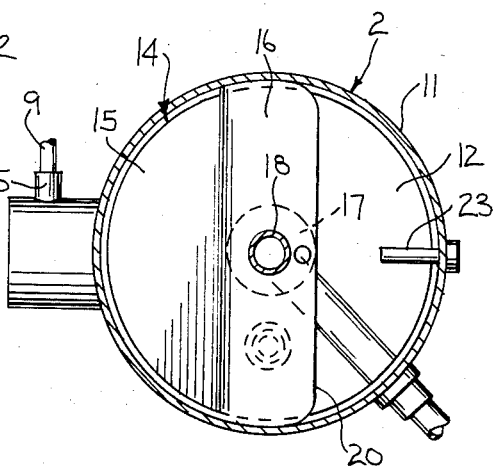
FIG. 3 is a section taken along line 3—3 of FIG. 2.

As shown in FIGS. 2 and 3, the separator 2 includes a generally cylindrical tank 11 having its lower end enclosed by a bottom 12 and a removable cover 13 is attached to the upper end of tank 11.

Mounted within tank 11 in direct alignment with inlet line 1 is an inclined baffle 14. Baffle 14 includes an inclined section 15 and a horizontal section 16. Inclined section 15 is located at an angle of about 45° to the horizontal and is formed as a part of an ellipse, so that the side edges of inclined section 15 are in close proximity to the inner wall of tank 11.

Horizontal section 16 of baffle 14 is secured by a rivet to a ring 17 mounted on vertical pipe 18 which is located centrally of tank 11. The upper end of pipe 18 is spaced just slightly below cover 13, while the lower end of pipe 18 is bent radially and is connected to outlet 19 in the lower portion of the tank. Outlet 19 is connected to oil discharge line 3.

The oil-contaminated water entering tank 11 through line 1, will be deflected upwardly by baffle 14 and the larger drops of oil will rise to the top of the tank 11 and be collected as a layer. The water, containing smaller droplets of oil generally having a size less than 250 microns, will flow downwardly past the rear edge 20 of baffle 14 and be discharged from the bottom of tank 11 through an outlet 21. Outlet 21 is connected to line 5.

The bottom wall 12 of tank 11 is also provided with a drain outlet which is normally closed by a drain cock 22.

To discharge the collected oil from the upper end of tank 11, a sensing mechanism is employed which takes the form of a liquid sensing probe 23. Probe 23 can be a capacitance type sensor in which the capacitance varies with the depth of oil accumulated in the tank. When the oil accumulates to a predetermined or set depth, probe 23 will act to operate pump 4 and terminate operation of the main pump 6. By operating pump 4, the oil will be drawn through pipe 18 and discharged through line 3 to an oil recovery site.

When the depth of oil in the separator tank 11 recedes to a minimum level, probe 23 will operate to discontinue operation of the oil pump 4 and to re-start operation of the main pump 6.

The coalescer element 8 is a standard type and water and oil can both pass through the element, while dirt and other solid particles will be retained. In time, particulate material may clog the coalescer element in which case, the element can be replaced.

Small oil droplets collect on the outer surface of the coalescer element 8 and the oil droplets will grow in size or coalesce until they are large enough to release from the element and be collected in the upper end of the coalescer tank 7.

In practice, the main water flow through separator 2 and coalescer unit 7 resulting from operation of pump 6 will be about 2.5 gpm. The difference in pressure between the gravity separator 2 and the coalescer unit 7 resulting from operation of pump 6 will cause a flow of liquid from the coalescer unit 7 through line 9 to the separator, and a control valve 24 is mounted in line 9 and normally controls the recirculating flow to about 0.1 gpm. The oil being returned to the separator 2 through line 9 is introduced into line 1 adjacent tank 11 through fitting 25 and the recirculating oil will mix with the water being introduced into the separator through line 1.

In certain situations where the water contains a low percentage of contaminated oil, very little oil may be collected in the coalescer unit 7, with the result that the recirculating liquid will be primarily water.

Standard check valves 26 and 27 are mounted in lines 3 and 10 respectively to permit flow in one direction, but prevent return flow.

The invention provides a compact, inexpensive system for separating oil from water and has particular application for the separation of oil from bilge water before the bilge water is discharged overboard.

The separating system is capable of reducing the oil content to less than 15 ppm regardless of the original concentration of oil in the contaminated water. As the oil collected in the coalescer unit 7 is recirculated to the separator 2, only one separation system is required for both the gravity separator and the coalescer.

Various modes of carrying out the invention are contemplated as being within the scope of the following claims particularly pointing out and distinctly claiming the subject matter which is regarded as the invention.

I claim:

1. In a system for separating two immiscible liquids of different specific gravities, a vertically disposed generally cylindrical tank having an inlet to receive a mixture of a lighter liquid and a heavier liquid, first outlet means communicating with the lower portion of the tank for discharging the heavier liquid, second outlet means communicating with the upper portion of the tank for discharging said lighter liquid, separator means in said tank and comprising a single generally flat plate disposed in said tank in direct alignment with said inlet, said plate being inclined upwardly and away from said inlet and extending upwardly from a level beneath said inlet to a level above said inlet and toward said second outlet means, said plate having an upper edge extending generally chordwise of said tank and having a lower curved edge disposed generally contiguous to the inner surface of said tank, approximately one half of the cross sectional area of the tank throughout the entire height of the tank being unobstructed whereby said mixture entering the tank through said inlet is deflected upwardly by said plate and said lighter liquid is collected as a layer in the upper end of said tank for discharge through said second outlet means and said heavier liquid flows downwardly through the unobstructed cross sectional area of said tank for discharge through said first outlet means.

2. The system of claim 1, wherein said second outlet means comprises a pipe disposed generally longitudinally of said tank and having an open upper end communicating with the upper portion of said tank, said upper edge of said plate being connected to said pipe.

3. The system of claim 2, wherein said plate is carried solely by said pipe.

4. The system of claim 1, wherein said plate is spaced from the upper end of said tank and the space is unobstructed.

5. The system of claim 1, and including first pumping means connected to said first outlet means for continually withdrawing said heavier liquid from said tank, and means responsive to a given level of said lighter liquid in the upper end of said tank for discontinuing operation of said first pumping means and withdrawing said lighter liquid from said tank through said second outlet means.

* * * * *